(12) United States Patent
Lanteigne et al.

(10) Patent No.: US 6,899,354 B2
(45) Date of Patent: May 31, 2005

(54) PIPE JOINING ASSEMBLY

(75) Inventors: Rene Lanteigne, Ste. Rose (CA); Doug Victor Woolford, London (CA)

(73) Assignee: Ipex Inc., Verdun (CA)

( * ) Notice: Subject to any disclaimer, the term of this patent is extended or adjusted under 35 U.S.C. 154(b) by 63 days.

(21) Appl. No.: 10/673,586

(22) Filed: Sep. 30, 2003

(65) Prior Publication Data

US 2004/0239106 A1 Dec. 2, 2004

(30) Foreign Application Priority Data

May 30, 2003 (CA) .............................................. 2430611

(51) Int. Cl.$^7$ .............................................. F16L 17/00
(52) U.S. Cl. ...................... 285/108; 285/113; 285/374; 285/230; 277/606
(58) Field of Search ................................. 285/374, 110, 285/108, 113, 230, 231, 339, 347, 379; 277/606, 609, 616

(56) References Cited

U.S. PATENT DOCUMENTS

| | | | | |
|---|---|---|---|---|
| 2,882,073 A | * | 4/1959 | James | 285/110 |
| 2,991,092 A | * | 7/1961 | MacKay | 285/231 |
| 3,858,912 A | * | 1/1975 | Bower | 285/230 |
| 4,027,901 A | | 6/1977 | Forni | |
| 4,047,739 A | | 9/1977 | Aitken | |
| 4,140,324 A | | 2/1979 | Mulas et al. | |
| 4,275,909 A | * | 6/1981 | Yoshizawa et al. | 285/110 |
| 4,566,704 A | | 1/1986 | Van Dongeren | |
| 4,637,618 A | | 1/1987 | Valls | |
| 4,693,483 A | | 9/1987 | Valls | |
| 4,906,010 A | * | 3/1990 | Pickering et al. | 285/110 |
| 5,239,944 A | | 8/1993 | Hostetler | |
| 6,457,718 B1 | * | 10/2002 | Quesada | 285/231 |

FOREIGN PATENT DOCUMENTS

| | | | | |
|---|---|---|---|---|
| CA | 1267175 | | 3/1990 | |
| FR | 2345655 | * | 10/1977 | 285/374 |

* cited by examiner

Primary Examiner—Aaron Dunwoody
(74) Attorney, Agent, or Firm—Riches, McKenzie & Herbert LLP

(57) ABSTRACT

An improved joining assembly employs a retainer ring member to hold in place a gasket member in a pipe or fitting. A resilient annular gasket member is placed inside a first conduit member (pipe or fitting). An annular retainer member is provided to secure the annular gasket member inside the first conduit member against longitudinal movement towards the open end of the first conduit member. A second conduit member is received by the assembled components comprising the retainer member, gasket member and first conduit member. The retainer ring member is fixed in place by a suitable adhesive or a suitable welding technique.

20 Claims, 6 Drawing Sheets

PIPE JOINING ASSEMBLY

FIELD OF THE INVENTION

This invention relates to joining assemblies for connecting lengths of pipe together, and more particularly joining assemblies for connecting the spigot end of a pipe or fitting into the bell end of a pipe or fitting where a gasket is secured in the bell.

BACKGROUND OF THE INVENTION

Conventional joining assemblies for joining the bell end of a tubular member and the spigot end of a tubular member which use a gasket therebetween are common. Such pipe joining assemblies utilize resilient, deflectable seals, sealing rings or gaskets. The gasket is normally secured in a recess in the bell end of the first conduit member (a pipe fitting or coupling for example) for sealing against the outer surface of the spigot end of the second conduit member or held in place by means of crimping the end of the pipe around a portion of the gasket as disclosed in U.S. Pat. No. 4,768,278.

It is an object of this invention to provide an improved joining assembly employing a retainer ring to keep the gasket in place in the bell end of the conduit.

It is a further object of this invention to provide an improved joining assembly between the bell of a pipe fitting or coupling (end of a tubular conduit member) and spigot, incorporating a gasket secured in the bell in a simple yet reliable manner to provide a more effective and reliable seal that may be easily formed by semi-skilled or even unskilled workers.

Further and other objects of the invention will be apparent to those skilled in the art from the following summary of the invention and detailed description of embodiments thereof.

SUMMARY OF THE INVENTION

Accordingly, in one of its aspects, this invention resides in a joining assembly comprising: a first conduit member for receiving and sealingly joining a second conduit member, the first conduit member comprising: a central longitudinal axis; a generally radially extending conduit end surface; a first inner conduit surface extending generally parallel to the central longitudinal axis from the conduit end surface to a radially outward end of a second inner conduit surface; the second inner conduit surface extending generally radially from the first inner conduit surface to a third inner conduit surface; the third inner conduit surface extending generally parallel to the central longitudinal axis from the second inner conduit surface to a fourth inner conduit surface; the fourth inner conduit surface extending generally radially from the third inner conduit surface to a fifth inner conduit surface; the fifth inner conduit surface extending generally parallel to the central longitudinal axis from the fourth inner conduit surface to a sixth inner conduit surface; the sixth inner conduit surface extending generally radially inwardly from the fifth inner conduit surface; seventh inner conduit surface extending generally parallel to the central longitudinal axis from the sixth inner conduit surface; wherein the third inner conduit surface has a first portion proximate the second inner conduit surface and a second portion remote from the second inner conduit surface; an annular gasket member comprising: a first gasket surface extending generally radially and abutting against the fourth inner conduit surface; a second gasket surface extending generally parallel to the central longitudinal axis and corresponding to the fifth inner conduit surface; a third gasket surface extending generally radially and corresponding to the sixth inner conduit surface; a fourth gasket surface extending generally parallel to the central longitudinal axis and abutting against the second portion of the third inner conduit surface; a fifth gasket surface extending generally radially inwardly towards the central longitudinal axis from an end of the fourth gasket surface opposite from the first gasket surface; and a sixth gasket surface extending from the fifth gasket surface to the fourth gasket surface, wherein the sixth gasket surface comprises a sealing member extending radially inwardly; an annular retainer member comprising: a first retainer surface extending generally parallel to the central longitudinal axis and abutting against the first inner conduit surface; a second retainer surface extending generally radially inwardly from the first retainer surface and abutting against the second inner conduit surface; a third retainer surface extending generally parallel to the central longitudinal axis and abutting against the first portion of the third inner conduit surface; a fourth retainer surface extending generally radially inwardly from the third retainer surface and corresponding to the fifth gasket surface; wherein the retainer member is fixed to the first conduit member at the second retainer surface; and wherein the gasket member is locked against axial movement in a direction towards the end conduit surface by the fourth surface of the retainer member and wherein the gasket member is locked against axial movement in a direction away from the end conduit surface by the fourth inner conduit surface of the conduit member.

Further aspects of the invention will become apparent upon reading the following detailed description and drawings which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Figure 1:
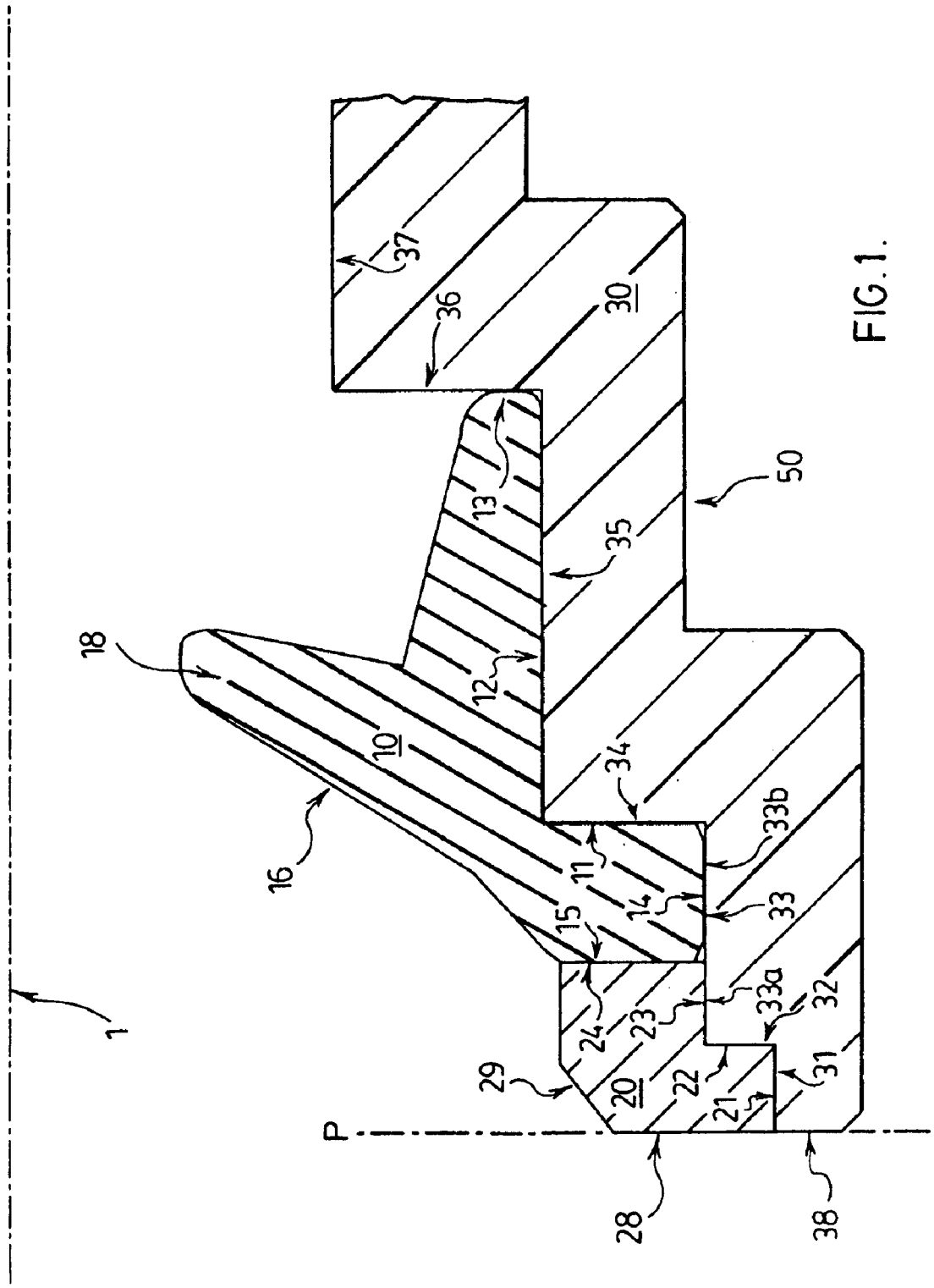
FIG. 1 is a partial, longitudinal cross-sectional view of a pipe joining assembly according to an embodiment of the invention.

One embodiment of the present invention is shown generally in FIG. 1. Resilient annular gasket member 10 is placed inside the bell portion 50 of a first conduit member 30. The first conduit member 30 may be a pipe or a fitting or other applicable tubular member. Annular retainer member 20 is provided to secure the annular gasket member 10 inside bell 50. A second conduit member 2, which may be a pipe, fitting or other suitable tubular member matched to the first conduit member 30, is received by the assembled components comprising retainer member 20, gasket member 10 and first conduit member 30. Each of the retainer member 20, the gasket member 10, the first conduit member 30 and the second conduit member 2 has a central longitudinal axis 1.

The diameter of the aperture defined by gasket member 10 is smaller than the outer diameter of second conduit member 2 to be joined, such that upon insertion of second conduit member 2 into bell 50 of conduit member 30, gasket member 10 is deflected and compressed by second conduit member 2 and forms a fluid seal.

Referring to FIG. 1, first conduit member 30 comprises a conduit end surface 38 which extends generally radially. First inner conduit surface 31 extends generally parallel to central longitudinal axis 1 from conduit end surface 38 to a radially outward end of second inner conduit surface 32. Second inner conduit surface 32 extends generally radially from first inner conduit surface 31 to third inner conduit surface 33, which in turn extends generally parallel to the central longitudinal axis 1 from second inner conduit surface 32 to fourth inner conduit surface 34.

Fourth inner conduit surface 34 extends generally radially from third inner conduit surface 33 to fifth inner conduit surface 35, which in turn extends generally parallel to the central longitudinal axis 1 from fourth inner conduit surface 34 to sixth inner conduit surface 36. Sixth inner conduit surface 36 extends generally radially inwardly from fifth inner conduit surface 35, and seventh inner conduit surface 37 extends generally parallel to central longitudinal axis 1 from sixth inner conduit surface 36. Seventh inner conduit surface 37 corresponds to the inside surface of conduit member 30.

Third inner conduit surface 33 has a first portion 33a proximate second inner conduit surface 32 and a second portion 33b remote from second inner conduit surface 32.

As shown in FIG. 1, resilient annular gasket member 10 comprises a first gasket surface 11 which extends generally radially and, when placed into position to receive the second conduit member 2, abuts against fourth inner conduit surface 34 to retain gasket member 10 inside conduit member 30. Second gasket surface 12 extends generally parallel to central longitudinal axis 1 and corresponds to fifth inner conduit surface 35. Third gasket surface 13 extends generally radially and corresponds to sixth inner conduit surface 36. Fourth gasket surface 14 extends generally parallel to central longitudinal axis 1 and abuts against second portion 33b of third inner conduit surface 33. Fifth gasket surface 15 extends generally radially inwardly towards central longitudinal axis 1 from an end of fourth gasket surface 14 opposite from first gasket surface 11. Sixth gasket surface 16 extends from fifth gasket surface 15 to third gasket surface 13. Sixth gasket surface 16 comprises resilient sealing member 18 extending radially inwardly.

Figure 2:
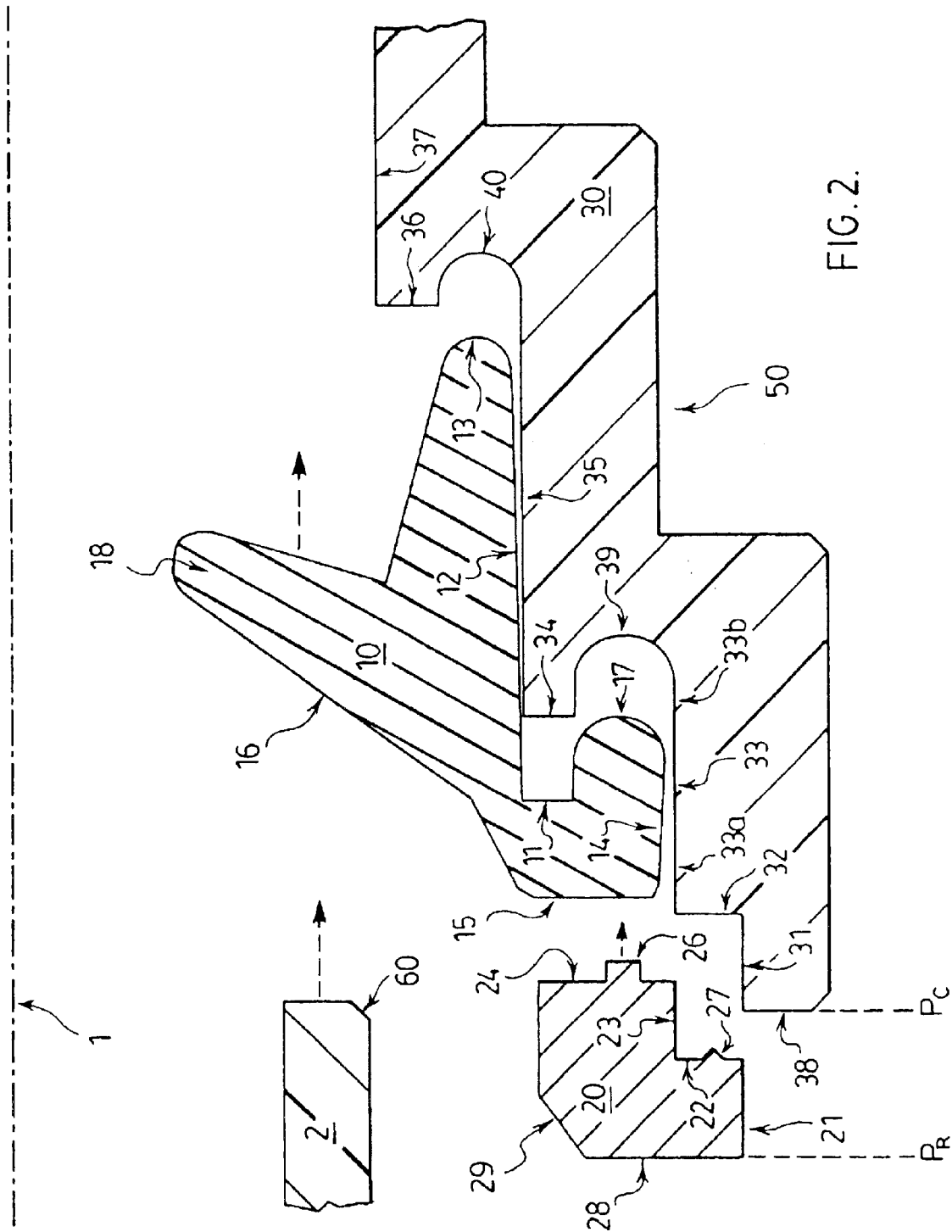
FIG. 2 is a partial, longitudinal cross-sectional view of the components of the pipe joining assembly as they are to be assembled according to a preferred embodiment of the invention.
Figure 3:
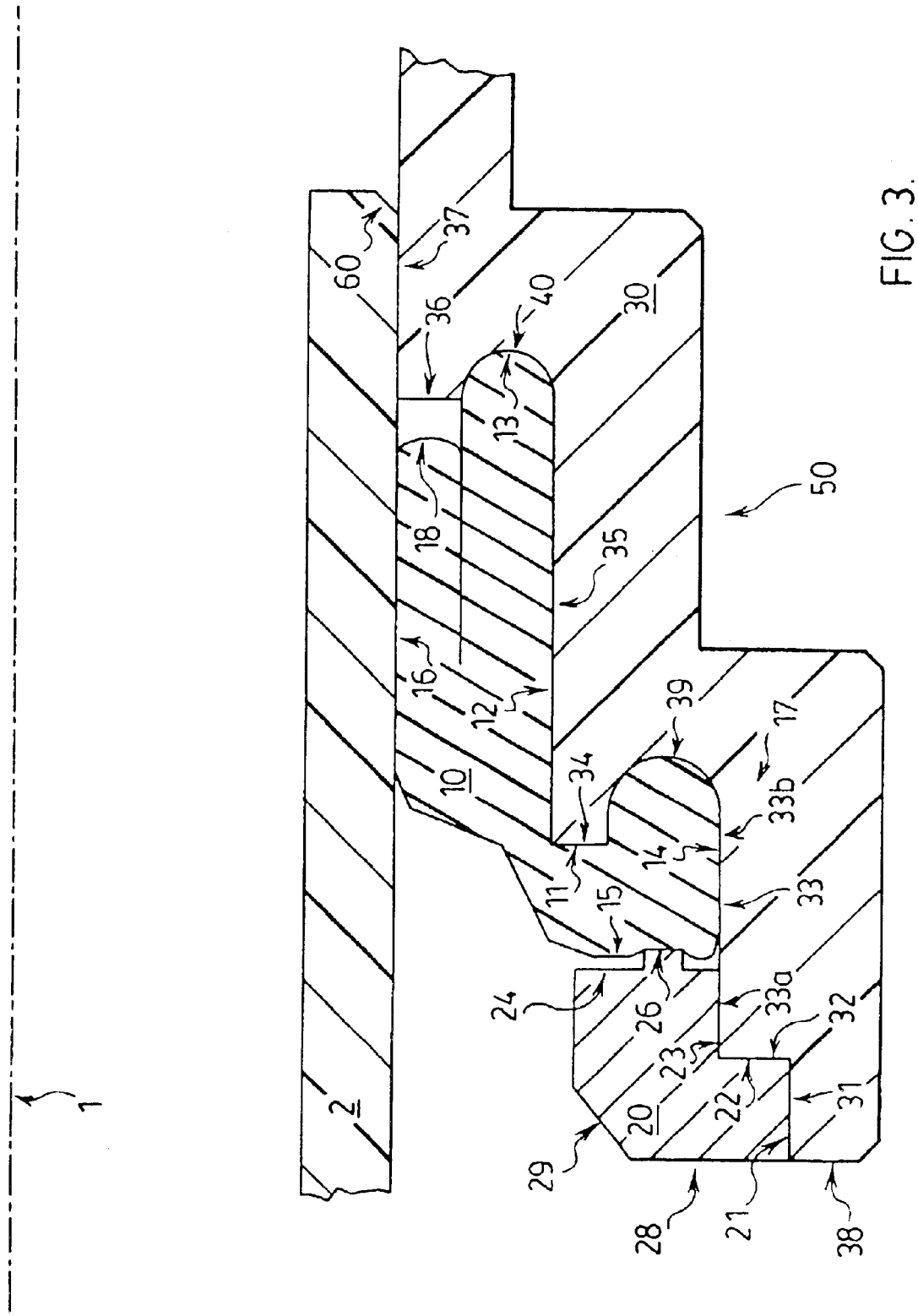
FIG. 3 is a partial, longitudinal cross-sectional view of the pipe joining assembly when fully assembled according to a preferred embodiment of the invention.

As noted above, gasket member 10 is deflected by second conduit member 2 to form a fluid seal. To this end, sealing member 18 is urged inwardly away from conduit end surface 38 by a lip 60 of second conduit member 2 as it is inserted into the joining assembly, as shown in FIGS. 2 and 3.

Referring to FIG. 1, annular retainer member 10 comprises first retainer surface 21 which extends generally parallel to central longitudinal axis 1 and abuts against first inner conduit surface 31. Second retainer surface 22 extends generally radially inwardly from first retainer surface 21 and abuts against second inner conduit surface 32. Third retainer surface 23 extends generally parallel to central longitudinal axis 1 and abuts against first portion 33a of third inner conduit surface 33. Fourth retainer surface 24 extends generally radially inwardly from third retainer surface 23 and corresponds to fifth gasket surface 15.

Retainer member 20 can be fixed to first conduit member 30 at second retainer surface 22 and second inner conduit surface 32 by an appropriate adhesive material. The adhesive material is preferably selected from the following: PVC cement, methacrylate adhesive and cyanoacrylate adhesive.

Alternatively, second retainer surface 22 can be fixed to second inner conduit surface 32 by ultrasonic welding, heat welding or spin welding. For the aforementioned welding methods, it is preferred that second retainer surface 22 includes a protrusion 27, as shown in FIG. 2. This protrusion may be triangular in cross-section, for example. A protrusion on second retainer surface 22 serves as a point to concentrate contact between retainer member 20 and second inner conduit surface 32 during the welding process. The protrusion provides an "energy director" point to concentrate all of the ultrasonic energy, for example. Ultimately, the protrusion melts to form a flush surface against second inner conduit surface 32.

Gasket member 10 is locked against axial movement in a direction towards end conduit surface 38 by the retainer member at fourth retainer surface 24. Also, gasket member 10 is locked against axial movement in a direction away from end conduit surface 38 by fourth inner conduit surface 34 of conduit member 30.

In a preferred embodiment, as shown in FIG. 3, fourth retainer surface 24 comprises fourth retainer surface protrusion 26 such that fourth retainer surface protrusion 26 is the only portion of the fourth retainer surface that abuts against fifth gasket surface 15. In a more preferred embodiment, the longitudinal cross-section of fourth retainer surface protrusion 26 has a square shape. The purpose of protrusion 26 is to reduce the surface area of retainer member 20 in contact with fifth gasket surface 15 to allow for the compression of gasket member 10.

Although fourth retainer surface protrusion 26 has been defined as a "protrusion", a method for forming fourth retainer surface protrusion 26 includes removing material from the inner and outer radial parts of fourth retainer surface 24.

In another embodiment, fourth retainer surface protrusion 26 need not form an unbroken, continuous annular surface in one plane. Rather, fourth retainer surface protrusion 26 may have an annular surface that is "segmented" or broken to provide less or intermittent surface area in contact with fifth gasket surface 15.

Preferably, as shown in FIG. 2, fourth inner conduit surface 34 comprises fourth inner conduit surface recess 39 and first gasket surface 11 comprises first gasket surface protrusion 17 such that fourth inner conduit surface recess 39 is adapted to receive first gasket surface protrusion 17. Preferably, the configuration of fourth inner conduit surface recess 39 can accommodate deformation of gasket member 10 when retainer member 20 is fixed to first conduit member 30 at second retainer surface 22. This configuration further locks gasket member 10 in place once retainer member 20 is fixed to first conduit member 30. This locking function of recess 39 is particularly useful to lock gasket member 10 in place to prevent it from being dislodged during insertion of second conduit member 2.

As shown in FIG. 1, to facilitate insertion of second conduit member 2 into the joining assembly, retainer member 20 may include a chamfered, angled or rounded radially-inner edge 29 adjacent to a plane P defined by end conduit surface 38.

As shown in FIG. 2, to facilitate gasket member 10 accommodating second conduit member 2 during its insertion, sixth inner conduit surface 36 may include sixth inner conduit surface recess 40 that is adapted to receive third gasket surface 13. More preferably, sixth inner conduit surface recess 40 is recessed to form an annular space to accommodate deformation of gasket member 10 during insertion of second conduit member 2 into the joining assembly.

A preferred material for first conduit member 30, the second conduit member 2 and the retainer member 20 is a suitable plastic. A suitable plastic material is preferably one selected from the following: polyvinyl chloride (PVC), chlorinated polyvinyl chloride (CPVC), acrylonitrile butadiene styrene (ABS), polyethylene (PE) and polypropylene (PP).

It is preferable that the joining assembly, once fully assembled, has the retainer end surface 28 of the retainer member 20 "flush" with the conduit end surface 38. In other words, the retainer member 20 has a retainer end surface 28 extending generally radially from an end of the first retainer surface 21 opposite from the second retainer surface 22, wherein the end retainer surface 28 defines a first plane $P_R$ (as shown in FIG. 2), and the generally radially-extending conduit end surface 38 defines a second plane $P_C$ (as shown in FIG. 2), and wherein the first plane $P_R$ and the second plane $P_C$ are substantially coincident, as shown as plane P in FIG. 1.

Figure 4:
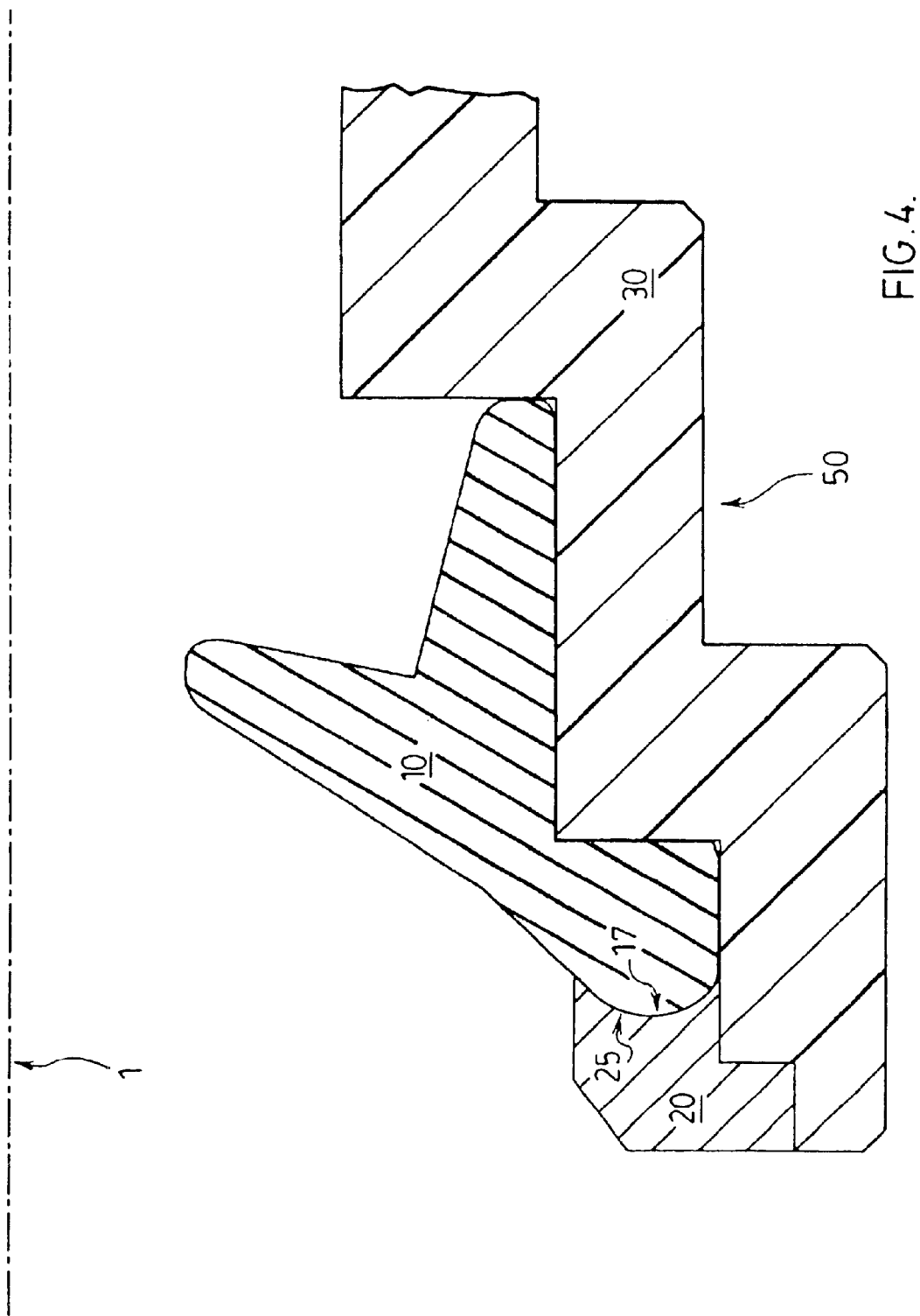
FIG. 4 is a partial, longitudinal cross-sectional view of the pipe joining assembly according to a preferred embodiment of the invention.

As shown in FIG. 4, for supplemental locking, fifth gasket surface 15 may include a fifth gasket surface protrusion 17, and fourth retainer surface 24 may be recessed 25 to receive the fifth gasket surface protrusion 17.

Figure 5:
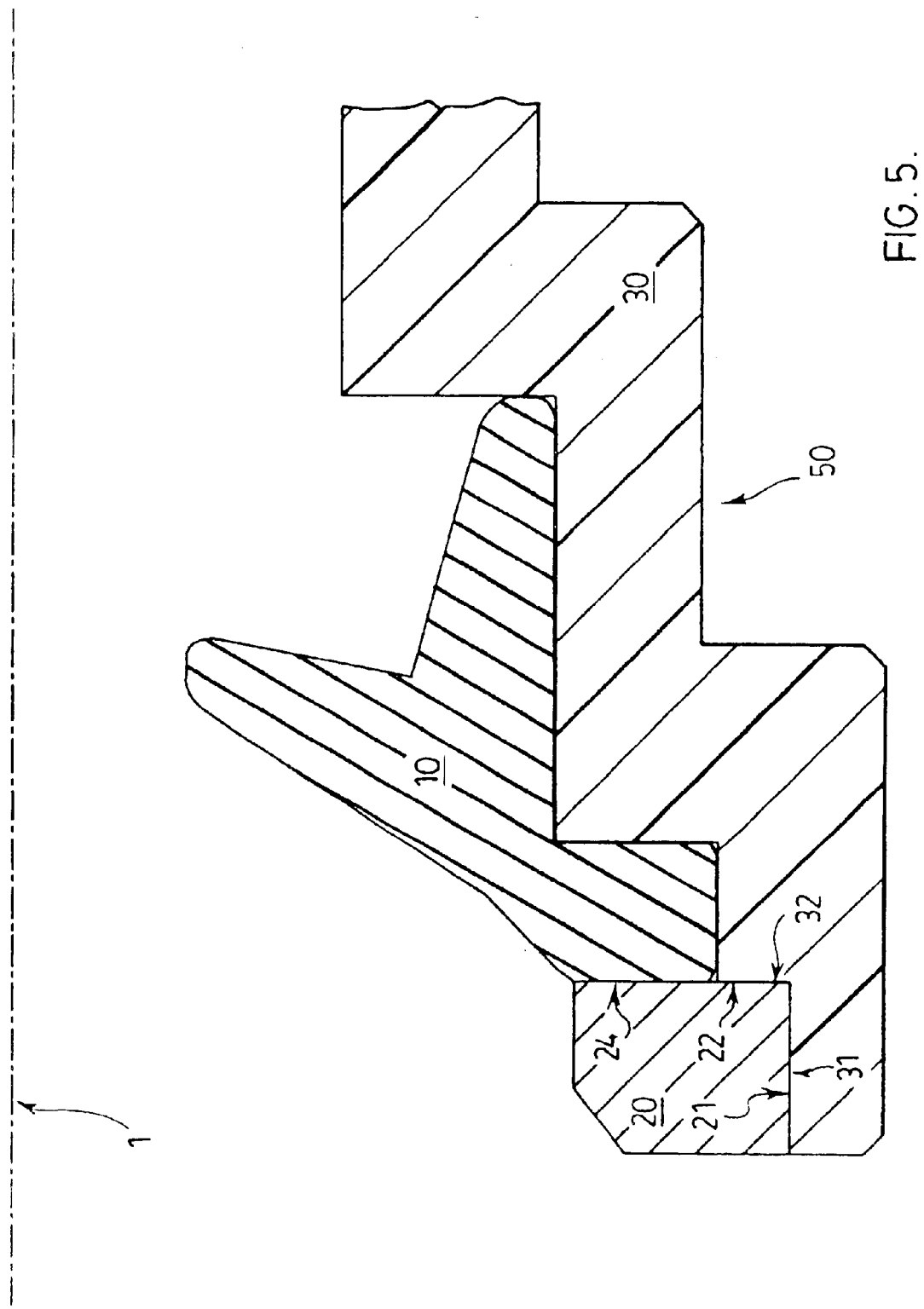
FIG. 5 is a partial, longitudinal cross-sectional view of the pipe joining assembly according to a preferred embodiment of the invention.
Figure 6:
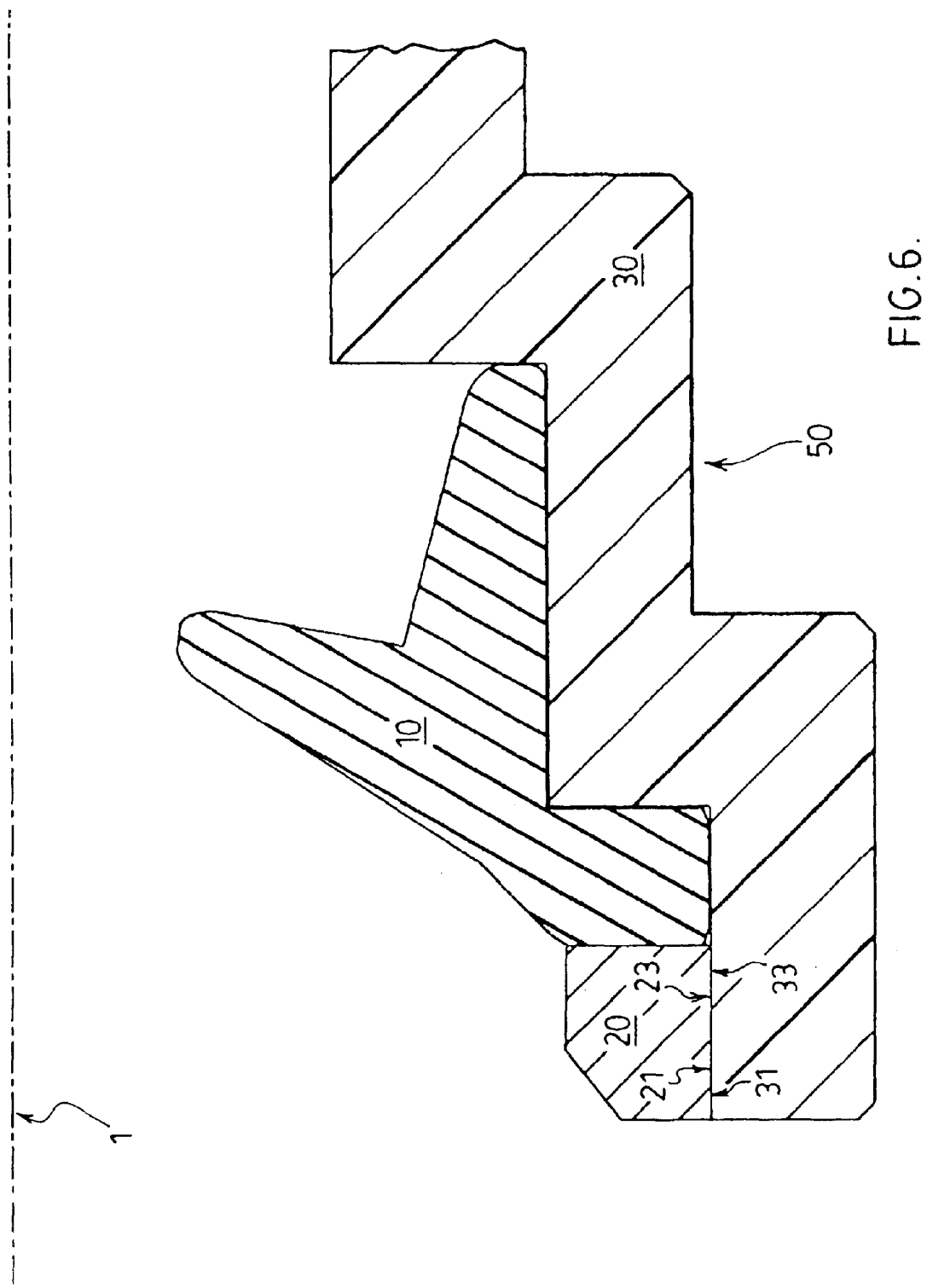
FIG. 6 is a partial, longitudinal cross-sectional view of the pipe joining assembly according to a preferred embodiment of the invention.

Other variations of retainer member 20 may include the third retainer surface 23 having a zero longitudinal length such that second retainer surface 22 and fourth retainer surface 24 are coincident (as shown in FIG. 5), or each of the second retainer surface 22 and the second inner conduit surface 32 having a zero radial length such that first retainer surface 21 is coincident with third retainer surface 23 and first inner conduit surface 31 is coincident with third inner conduit surface 33 (as shown in FIG. 6).

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments which are functional, or mechanical equivalents of the specific embodiments and features that have been described and illustrated herein.

What is claimed is:

1. A joining assembly comprising:
a first conduit member for receiving and sealingly joining a second conduit member, the first conduit member comprising:
a central longitudinal axis;
a generally radially extending conduit end surface;
a first inner conduit surface extending generally parallel to the central longitudinal axis from the conduit end surface to a radially outward end of a second inner conduit surface;
the second inner conduit surface extending generally radially from the first inner conduit surface to a third inner conduit surface;
the third inner conduit surface extending generally parallel to the central longitudinal axis from the second inner conduit surface to a fourth inner conduit surface;
the fourth inner conduit surface extending generally radially from the third inner conduit surface to a fifth inner conduit surface;
the fifth inner conduit surface extending generally parallel to the central longitudinal axis from the fourth inner conduit surface to a sixth inner conduit surface;
the sixth inner conduit surface extending generally radially inwardly from the fifth inner conduit surface;
seventh inner conduit surface extending generally parallel to the central longitudinal axis from the sixth inner conduit surface;
wherein the third inner conduit surface has a first portion proximate the second inner conduit surface and a second portion remote from the second inner conduit surface;
an annular gasket member comprising:
a first gasket surface extending generally radially and abutting against the fourth inner conduit surface;
a second gasket surface extending generally parallel to the central longitudinal axis and corresponding to the fifth inner conduit surface;
a third gasket surface extending generally radially and corresponding to the sixth inner conduit surface;
a fourth gasket surface extending generally parallel to the central longitudinal axis and abutting against the second portion of the third inner conduit surface;
a fifth gasket surface extending generally radially inwardly towards the central longitudinal axis from an end of the fourth gasket surface opposite from the first gasket surface; and
a sixth gasket surface extending from the fifth gasket surface to the third gasket surface, wherein the sixth gasket surface comprises a sealing member extending radially inwardly;
an annular retainer member comprising:
a first retainer surface extending generally parallel to the central longitudinal axis and abutting against the first inner conduit surface;
a second retainer surface extending generally radially inwardly from the first retainer surface and abutting against the second inner conduit surface;
a third retainer surface extending generally parallel to the central longitudinal axis and abutting against the first portion of the third inner conduit surface;
a fourth retainer surface extending generally radially inwardly from the third retainer surface and corresponding to the fifth gasket surface;
wherein the retainer member is fixed to the first conduit member at the second retainer surface; and
wherein the gasket member is locked against axial movement in a direction towards the end conduit surface by the fourth surface of the retainer member and wherein the gasket member is locked against axial movement in a direction away from the end conduit surface by the fourth inner conduit surface of the conduit member.

2. The joining assembly as defined in claim 1 wherein the first conduit member is plastic.

3. The joining assembly as defined in claim 2 wherein the retainer member is plastic.

4. The joining assembly as defined in claim 1 wherein the first conduit member is made of a plastic material selected from the following: polyvinyl chloride (PVC), chlorinated polyvinyl chloride (CPVC), acrylonitrile butadiene styrene (ABS), polyethylene (PE) and polypropylene (PP).

5. The joining assembly as defined in claim 4 wherein the retainer member is made of a plastic material selected from the following: polyvinyl chloride (PVC), chlorinated polyvinyl chloride (CPVC), acrylonitrile butadiene styrene (ABS), polyethylene (PE) and polypropylene (PP).

6. The joining assembly as defined in claim 5 wherein the second retainer surface is fixed to the second inner conduit surface by an adhesive material.

7. The joining assembly as defined in claim 6 wherein the adhesive material is selected from the following: PVC cement, methacrylate adhesive and cyanoacrylate adhesive.

8. The joining assembly as defined in claim 5 wherein the second retainer surface is fixed to the second inner conduit surface by a method selected from the following: ultrasonic welding, heat welding and spin welding.

9. The joining assembly as defined in claim 6 wherein the sixth inner conduit surface comprises a sixth inner conduit surface recess, and wherein the sixth inner conduit surface recess is adapted to receive the third gasket surface.

10. The joining assembly as defined in claim 9, wherein the sixth inner conduit surface recess is recessed to accommodate deformation of the gasket member during insertion of the second conduit member into the joining assembly.

11. The joining assembly as defined in claim 6 wherein the fourth inner conduit surface comprises a fourth inner conduit surface recess, the first gasket surface comprises a first gasket surface protrusion, and wherein the fourth inner conduit surface recess is adapted to receive the first gasket surface protrusion.

12. The joining assembly as defined in claim 11 wherein the fourth inner conduit surface recess is recessed to accommodate deformation of the gasket member during insertion of the second conduit member into the joining assembly.

13. The joining assembly as defined in claim 12 wherein the retainer member comprises a chamfered, angled or rounded radially-inner edge adjacent to a plane defined by the generally radially extending end conduit surface.

14. The joining assembly as defined in claim 6, wherein the retainer member has a retainer end surface extending generally radially from an end of the first retainer surface opposite from the second retainer surface;

the end retainer surface defines a first plane;

the generally radially extending conduit end surface defines a second plane; and wherein the first plane and second plane are substantially coincident.

15. The joining assembly as defined in claim 6, wherein the fifth gasket surface comprises a fifth gasket surface protrusion, and the fourth retainer surface is recessed to receive the fifth gasket surface protrusion.

16. The joining assembly as defined in claim 6, wherein the fourth retainer surface comprises a fourth retainer surface protrusion such that only the fourth retainer surface protrusion is the only portion of the fourth retainer surface that abuts against the fifth gasket surface.

17. The joining assembly as defined in claim 16, wherein the longitudinal cross-section the forth retainer surface protrusion has a square shape.

18. The joining assembly as defined in claim 16 wherein the fourth retainer surface protrusion has an annular surface that is not a single plane, but is intermittent so as to provide less surface area in contract with the fifth gasket surface.

19. The joining assembly as defined in claim 6 wherein the third retainer surface has zero longitudinal length.

20. The joining assembly as defined in claim 6 wherein each of the second retainer surface and the second inner conduit surface has zero radial length.

* * * * *